June 4, 1963 R. B. JOHNSON 3,092,686
FACSIMILE APPARATUS FOR ENLARGING IMAGES IN COLOR
Filed Aug. 17, 1959 5 Sheets—Sheet 2

3,092,686
FACSIMILE APPARATUS FOR ENLARGING IMAGES IN COLOR
Reynold B. Johnson, Palo Alto, Calif., assignor to International Business Machines Corporation, New York, N.Y., a corporation of New York
Filed Aug. 17, 1959, Ser. No. 834,208
2 Claims. (Cl. 178—5.2)

This invention relates in general to picture reproduction and relates more particularly to apparatus for producing enlarged reproductions in color of small photographs or the like.

There has been considerable interest for a number of years in developing apparatus for producing enlarged images in color from relatively small input objects such as photographic transparencies and the like. The production of such enlarged images would find use in a number of fields such as advertising and the like where displays in color have considerable appeal. The most straightforward method of producing such large displays is to optically project an image of the input object onto a suitable projection surface to provide the desired enlargement. However, this is unsatisfactory because the large amount of light which is required to produce a substantial enlargement prevents the preservation of the colors of the original object.

There have been numerous devices proposed for producing enlarged images of an input object in the form of a color transparency or slide which is scanned by a beam of light to produce one or more signals which are instantaneous measures of the color composition of the scanned portions of the slide. These control signals are then supplied to some suitable color reproduction mechanism which reproduces colors in accordance with the color or colors sensed by the scanning unit. In one of such devices the color printing mechanism is in the form of a plurality of paint sprayers which are selectively controllable to mix and spray paint, of a color corresponding to the color of the scanned portion of the photograph, on a display surface as the paint sprayer is swept across this surface.

Broadly, the present invention contemplates apparatus for producing a colored enlarged image of a relatively small transparent input object in which the image is produced on a translucent, back-lighted display surface by means of a plurality of color printing heads which deposit ink on the display surface. In accordance with the present invention, the input object, which is preferably in the form of a color transparency or slide, is optically scanned line by line for its color composition and the light resulting from such scanning is projected through a scanning mask to a plurality of different color filters. These color filters correspond to the three primary additive colors, i.e., red, blue and green. The light transmitted through the different filters is supplied to a plurality of associated photomultipliers which produce outputs having amplitudes which are measures of the light received by the different photomultipliers. The outputs from the photomultiplier devices are supplied to a plurality of digitizing amplifiers which each produce digital output pulses corresponding to the amounts of light received by the associated photomultiplier tubes. These digital output pulses are supplied to associated color printing heads which move across the display surface in synchronism with the scanning of the transparency and which are selectively controllable in response to the digital pulses.

In the preferred embodiment of the invention, the printing head for each color is provided with a plurality of separately movable printing elements. The printing elements for each color head are disposed closely adjacent each other in a suitable configuration and are adapted to be alternately moved into and out of contact with the display surface to deposit ink thereon in response to the control signals as the printing heads move across the display surface. The number of printing elements in each printing head may correspond to the total number of digital pulses from the associated photomultiplier so that each of the printing elements corresponds to one of the pulses. The number of printing elements which contact the display surface on a given printing stroke will then depend upon the number of digital pulses for that color head on that printing stroke.

The color printing in accordance with the present invention is preferably performed by means of color rejection techniques, in which the color filters associated with the scanning mask correspond to the primary additive colors while the colors of the inks in the color printing heads correspond to the primary subtractive colors, i.e., cyan, magenta and yellow. The color printing is performed by combining inks of the primary subtractive colors to produce the desired colors. The saturation of a given primary subtractive color on the display surface is controlled by varying the number of printing elements which contact the surface on a given printing stroke. For maximum saturation, all of the printing elements are actuated, while a varying number of elements less than all of them are actuated for saturation less than maximum. The exact color hue is reproduced on the display surface by overprinting with the three subtractive primary colors in the amount required to produce the desired hue.

To produce the desired printing by color rejection, the output from the red filter in the scanning apparatus is associated with the cyan printing head, the light from the blue filter is associated with the yellow printing head, and the light from the green filter is associated with the magenta printing head. The photomultipliers operate in such a way that if they receive light of only the color of their associated filter, they produce a signal to shut off their associated color printing head. Thus, if the portion of the picture being scanned has only red therein, this red light would be transmitted through the red filter to the cyan printing head to shut this printer off. However, the red light would not be transmitted through either the blue or the green filter so that the yellow and magenta printers associated with these latter two filters would be operative to print a combination of yellow and magenta to produce red. Similarly, if the scanned light contains only blue, this light would be transmitted through the blue filter to shut down the yellow printing head, while the cyan and magenta printing heads were operative to produce blue printing. The use of the subtractive primary colors assures the widest possible range of colors of the resultant display, while the use of non-pigmented inks and back-lighting of the display surface results in high contrast and brilliance.

It is therefore an object of the present invention to provide improved apparatus for producing enlarged images in color.

It is a further object of the present invention to provide apparatus for producing an enlarged image of an input object in color on a translucent back-lighted display surface in which the colors in the original input object are converted by means of a color rejection technique to control the color printing on the display surface.

It is a further object of the present invention to provide apparatus for producing an enlarged image of an original input object on a translucent back-lighted surface in which the printing is performed by means of a plurality of printing heads corresponding to each of the primary subtractive colors, and the number of such printing heads which are operable to print at any time on the display surface is controlled by the color composition of the original input object.

The foregoing and other objects, features and advantages of the invention will be apparent from the following more particular description of a preferred embodiment of the invention, as illustrated in the accompanying drawings.

Figure 1:
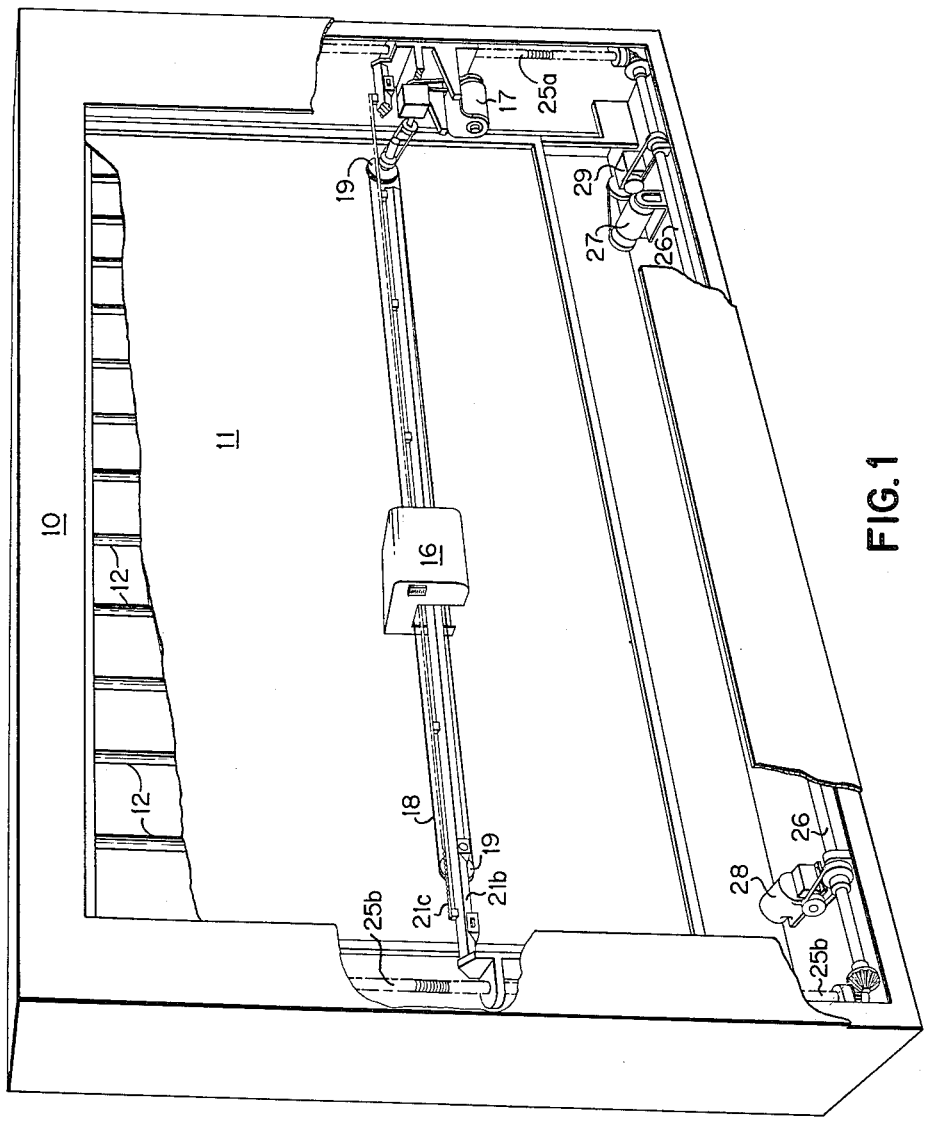
FIG. 1 is a perspective view, partly in cross section, of the display surface and printing carriage of the present invention.

FIG. 1 is a perspective view showing the translucent backlighted display surface and the mechanism for driving the printing carriage relative to this surface. Reference numeral 11 designates a translucent printing surface which is surrounded by a housing frame 10 and on which the color printing may be performed in accordance with the present invention. Material 11 should have sufficient rigidity to maintain its shape and strength under a variety of adverse conditions, particularly if the display is exposed to the weather. Material 11 should also be sufficiently translucent to permit light transmission from the back lighting to illuminate the inks printed on the display. Material 11 should also have a surface quality such that ink deposited thereon will remain in position without excessive running. This latter property is primarily a function of the inks themselves, although the use of a proper material for surface 11 will aid in producing the desired stability of the deposited ink.

Material 11 is illuminated from behind by a plurality of light sources indicated schematically at reference numeral 12. Light sources 12 may be of any suitable type, such as fluorescent tubes. A plurality of such light sources 12 is preferably provided at spaced points across the width of surface 11 and each of these sources extends substantially the full length of the display surface so as to produce substantially uniform illumination of display surface 11 without any bright or dark spots.

The printing is performed on the display surface 11 by means housed in a movable carriage 16 which moves across and down the display surface. Carriage 16 may traverse the display surface in any suitable manner and in the embodiment to be described, carriage 16 traverses display surface 11 sequentially line by line. A drive motor 17 drives a chain 18 which rotates over a pair of sprockets 19 disposed at opposite ends of the housing 10. Chain 18 carries a pin 20a (FIGS. 2 and 4) which fits between a pair of forked members 20b secured to the lower surface of carriage 16. Movement of chain 18 and pin 20a thus imparts horizontal movement to carriage 16 through members 20b. It will be seen that when pin 20a is on the upper part of chain 18, carriage 16 will move in one direction across surface 11, and that when pin 20a moves to the bottom of chain 18 (as it will do after passing around one of the sprockets 19), the direction of movement of carriage 16 will be reversed. Thus, chain 18 rotates continuously in one direction, while carriage 16 is periodically reversed by the action of pin 20a in passing over the sprockets.

Carriage 16 has rollers 21a which ride on a guide bar 21b extending the width of the display surface. A rack 21c is provided above bar 21b with a plurality of teeth on its upper surface which engage a gear inside carriage 16 to provide movement of the input transparency inside carriage 16 in synchronism with the movement of carriage 16 across surface 11, as will be described more fully in detail below.

Where the printing is to be performed sequentially line by line, as in the present embodiment, carriage 16 must be lowered at the end of each horizontal sweep across the display surface. The horizontal raising and lowering are performed by means of a pair of worm gear shafts 25a and 26b (FIG. 1) which are disposed vertically on opposite sides of the housing 10. Shafts 25a and 25b are driven through bevel gears from a drive shaft 26 which in turn is selectively connectable to a drive motor 27 or a drive motor 28. Motor 27 is selectively clutched to shaft 26 by a clutch 29 which is controlled by a pair of limit switches (not shown) on either end of the travel of carriage 16. These limit switches, when actuated by carriage 16 at each end of its horizontal travel, energize clutch 29 to connect motor 27 to shaft 26 and thus rotate shafts 25a, 25b a predetermined amount to lower carriage 16 and bar 21a an amount corresponding to one line on the surface 11. Upon completion of this predetermined vertical movement of carriage 16, clutch 29 is de-energized to disengage motor 27 from shaft 26 and thus stop the rotation of shafts 25a, 25b. Motor 28, which rotates shaft 26 in a direction opposite to its rotation when driven by motor 27, is energized at the completion of printing on surface 11 to return carriage 16 to the top of the display surface.

Figure 2:
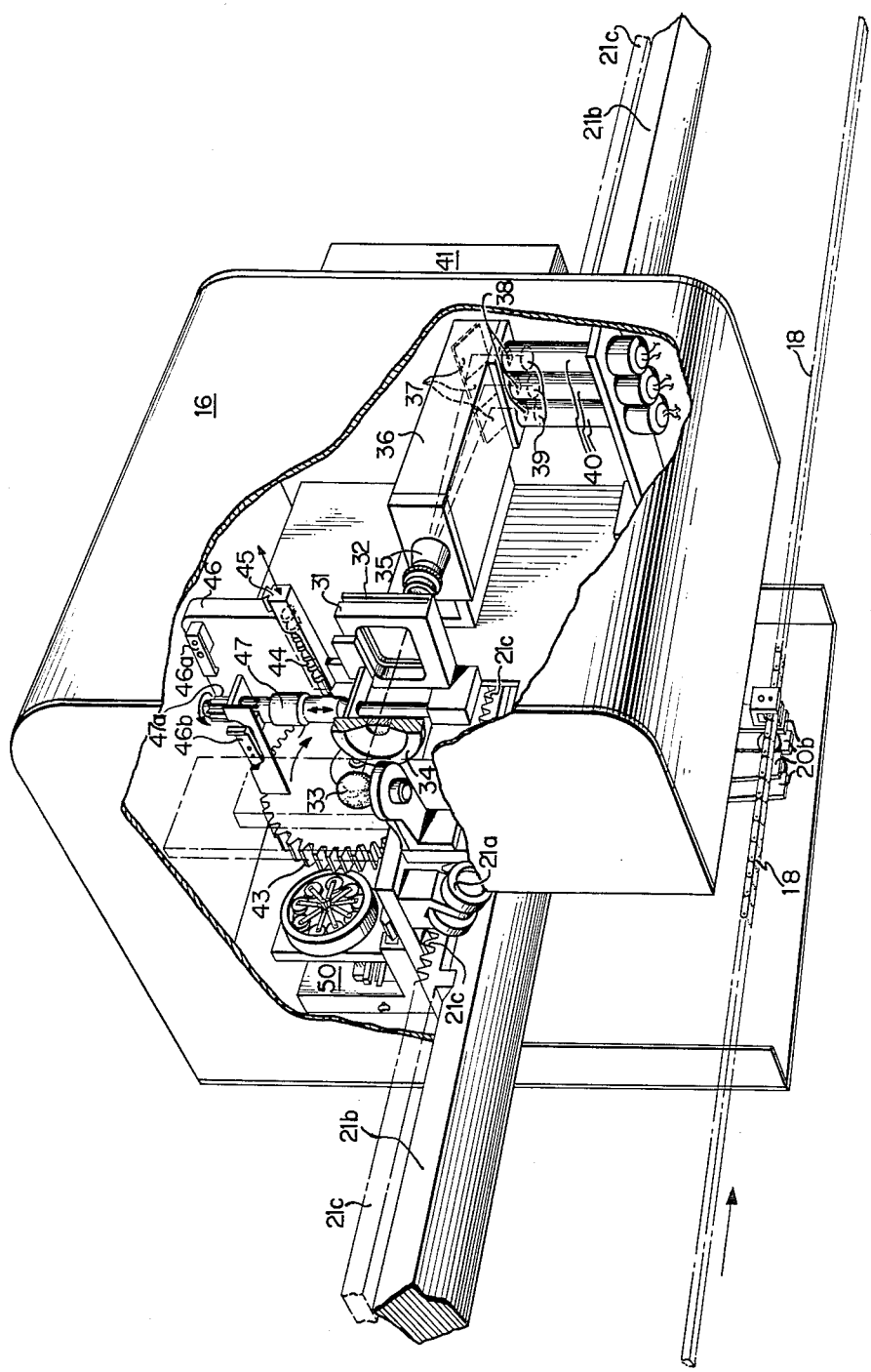
FIG. 2 is a perspective view, partly in cross section, illustrating the transparency scanning apparatus within the printing carriage.

The apparatus for scanning the color transparency or other input object is preferably housed in carriage 16 and is shown in the perspective view of FIG. 2. This apparatus includes a movable frame 31 adapted to hold a transparent slide 32 forming the input object which is to be reproduced in color on display surface 11. Frame 31 is moved in a manner to be described below so as to vary the scanned portion of slide 32 in synchronism with the movement of carriage 16 relative to display surface 11. Slide 32 is scanned by means of light projected from a source represented by a bulb 33 through a lens system 34 which focuses the light on a small incremental area of slide 32. The light from source 33 which passes through slide 32 then passes through a second lens system 35 and enters an enclosure 36 containing three mirrors 37, each of which receives different portions of light produced by the scanning of slide 32. Mirrors 37 are positioned so as to reflect the light impinging thereon through associated apertures 38. Each of these apertures has an associated color filter 39 disposed adjacent thereto, and the light passing through each of these color filters impinges upon an associated photomultiplier device 40.

Figure 3:
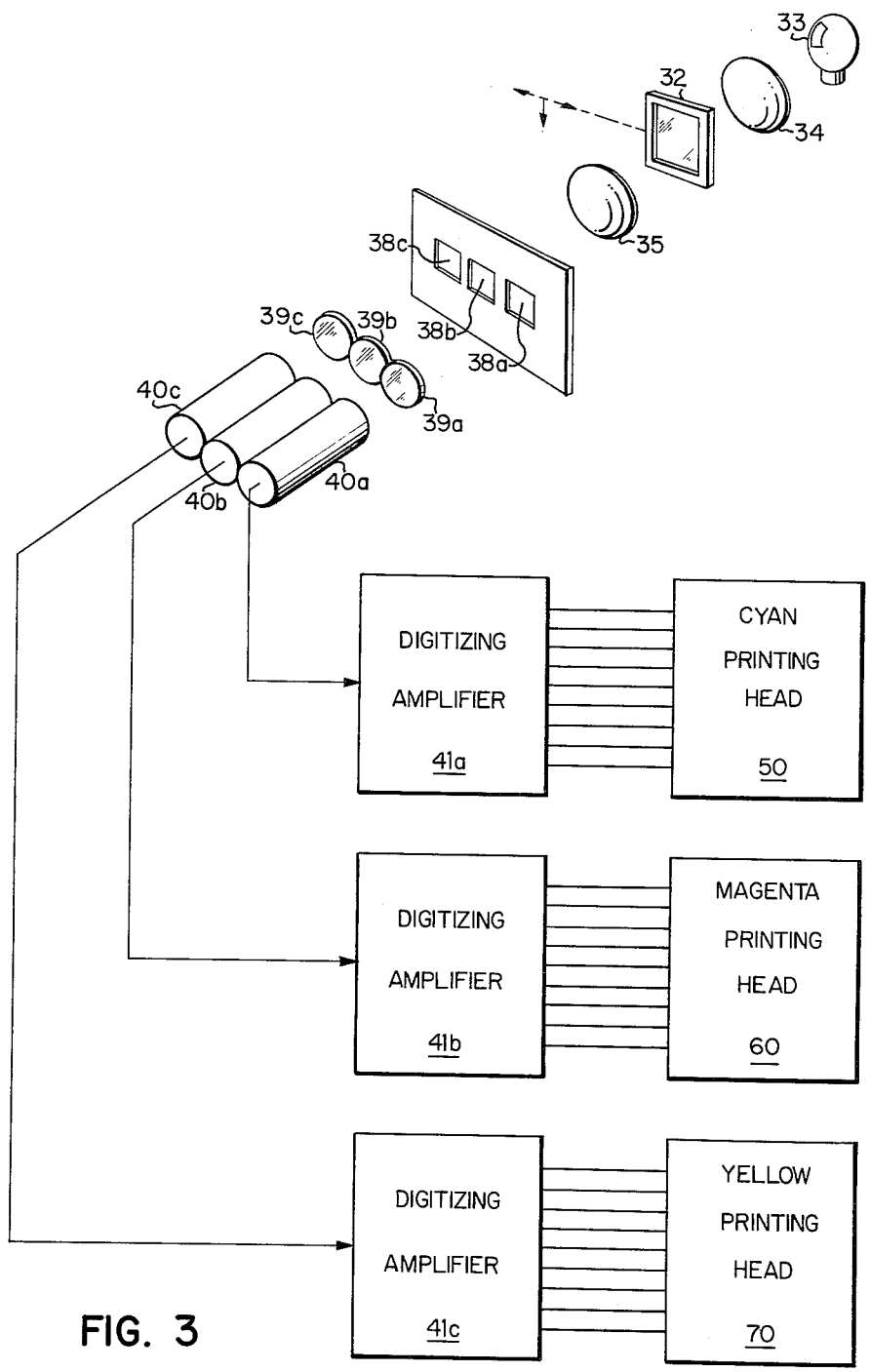
FIG. 3 is a schematic diagram illustrating the theory of printing by color rejection as applied in the present invention.

The functions of the elements of the color sensing apparatus are best illustrated in the schematic drawing of FIG. 3. As shown there, filters 39a, 39b and 39c are light filters corresponding to the primary additive colors, red, green and blue. The light projected through slide 32 from source 33 and reflected from mirrors 37 through apertures 38a, 38b, 38c, is thus broken down into its color components by means of the light filters 39a, 39b, 39c, so that the outputs of photomultipliers 40a, 40b, 40c are instantaneous measures of the amounts of light of the associated colors in the incremental area of the scanned portion of slide 32.

It will be understood that if the printing of the three prmary subtractive colors on display surface 11 were to be performed simultaneously on the same portion of the display surface, then the incremental area scanned on slide 32 at any given instant would be essentially a point, and the color composition of this scanned point could be determined simultaneously for all colors. However, since each of the color printing heads occupies a finite amount of space, it is preferable to separate the color printing heads along display surface 11 and to have these different color printing heads print simultaneously on different areas of the display surface. Under these conditions, the incremental area of slide 32 which is scanned at any instant should correspond to the area on display surface 11 occupied by the three color printing heads, so that the area on which a given color printing head is printing at any instant corresponds to the same area on the scanned portion of the slide.

The electrical output signals from photomultiplier tubes 40a, 40b and 40c are supplied to suitable digitizing amplifiers 41a, 41b, and 41c which may be conveniently mounted in carriage 16. These amplifiers are operable to convert the signal from the associated photomultiplier tube into a number of digital pulses corresponding to the amplitude of the photomultiplier output signal. In the embodiment described, it is assumed that each of the color printing heads comprise nine separately controllable printing elements. Each of these elements is selectively controllable to either print or not print on a given printing stroke in dependence upon a control signal from the associated photomultiplier. Thus, assuming that there are nine printing elements per color printing head, the output from each of the digitizing amplifiers may be in the form of nine channels, each of which is associated with a different one of the printing elements. The number of such channels on which pulses appear for a given printing stroke will be a function of the input from the associated photomultiplier tube so that the number of printing elements on a given head which are actuated will be a function of the light received by the associated photomultiplier. The connections from digitizing amplifiers 41a, 41b, 41c are shown schematically in FIG. 3 as nine conductors from each amplifier to the associated printing head. In FIG. 3 the printing heads are represented diagrammatically as devices 50, 60 and 70.

Referring again to FIG. 2, the apparatus for driving slide frame 31 past the scanning beam from source 32 includes a gear 43 which engages the teeth on rack 21c as carriage 16 moves horizontally across surface 11. Gear 43 drives a worm gear 44 which in turn drives a frame drive member 45 which is slidingly dovetailed into a fixed support member 46. Drive member 45 carries with it the slide frame 31 as well as a micrometer mechanism 47 which serves to move the slide frame 31 one line vertically at the end of each horizontal sweep. Micrometer 47 includes a vertical stepper gear 47a at the top thereof which rotates one step when it strikes either of a pair of fixed finger members 46a, 46b at each end of support member 46. This rotation of stepper gear 47a moves the slide frame 31 one line vertically for each step of rotation, and the gear is detented between rotation steps to maintain the vertical position of the slide.

Gears 43 and 44 are such that one horizontal sweep of carriage 16 across surface 11 produces one complete horizontal traverse of slide frame 31 and slide 32 past the scanning beam from light 33. It will be seen that when carriage 16 reverses direction, gear 43 will reverse its direction of rotation to drive member 45 and slide frame 31 in the opposite direction. Thus, slide 32 is scanned horizontally in synchronism with the horizontal movement of carriage 16 and micrometer mechanism 47 serves to advance the slide one line vertically at the completion of each horizontal sweep.

Figure 7:
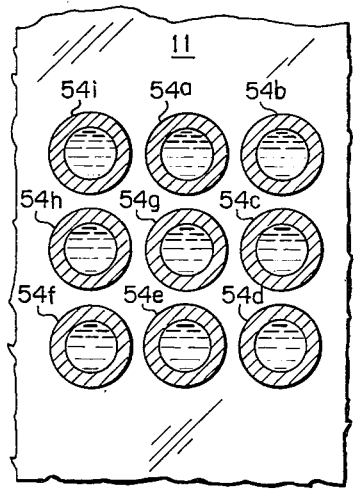
FIG. 7 is a sectional view taken along plane 7—7 of FIG. 6.
Figure 5:
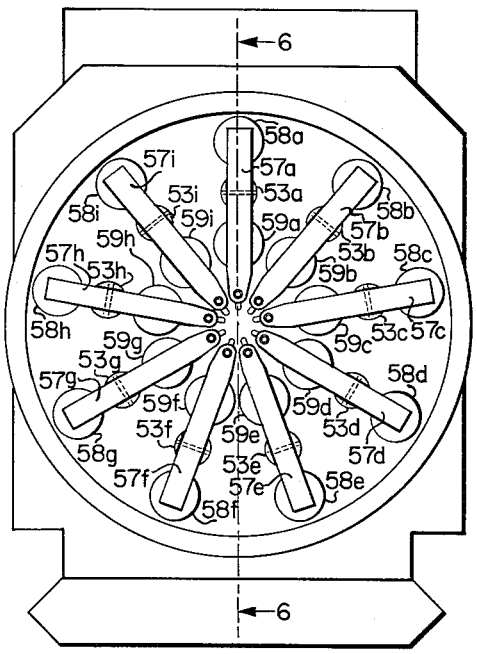
FIG. 5 is an elevational view showing the details of the structure of one of the color printing heads.
Figure 6:
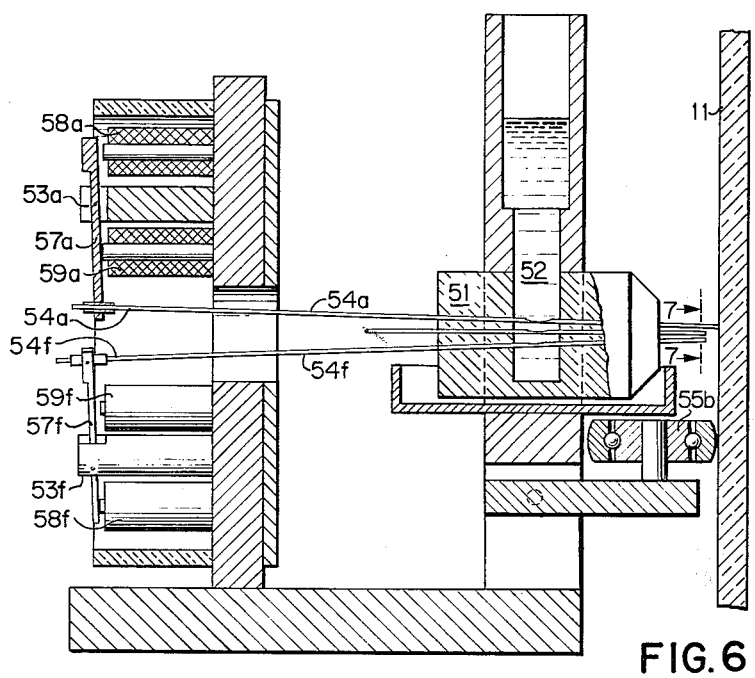
FIG. 6 is a sectional view taken along plane 6—6 of FIG. 5.

FIGS. 5, 6, and 7 illustrate one form of color printing head which has been found satisfactory for the purposes of the present invention. Since the printing heads 50, 60 and 70 are preferably identical, only the one head 50 is shown in detail in the drawings. The printing head includes a plurality of printing elements in the form of tubular members which are selectively moveable in response to the digital control pulses from amplifiers 41. Three of such printing elements 54 are shown for head 50 in FIG. 6, it being understood that a total of nine such printing elements will be provided for each printing head. The printing elements extend through a block 51 which defines an ink reservoir 52 for supplying ink of the appropriate color to the printing elements. Printing elements 54 are preferably a capillary pen type in which ink from reservoir 52 is drawn into the interior of the tubular printing elements through small openings in these printing elements by capillary action. Capillary action keeps the interior of each of the tubular printing elements filled with ink throughout its length. Thus, there is ink present in the tips of printing elements 54 at all times so that when the tip of a printing element contacts a surface such as display surface 11, a drop of ink of the approximate size of the inner diameter of one of the tubular members 54 is deposited on the surface.

To selectively actuate the printing elements 54, there are provided a plurality of electromagnetic actuating means. One end of each of the printing elements 54 is pivotally connected to an associated one of a series of armatures 57a, 57b, 57c, 57d, 57e, 57f, 57g, 57h and 57i. Each of armatures 57a—57i is in turn pivotally mounted on one of a series of support members 53a—53i between sets of coils 58a—58i and 59a—59i. Each of coils 58, 59 may be energized by the digital control pulses to either move the associated printing element 54 into contact with the display surface 11 so as to deposit a drop of ink thereon or to hold the printing element withdrawn from surface 11 so as not to print. The outermost coils, coils 58, are provided as "hold" coils so that when any one of these is energized its associated printing element is withdrawn from contact with display surface 11. Each of "print" coils 59, when energized, actuates its associated armature so as to move the associated printing element into contact with the display surface 11. The configuration of the ends of the printing elements adjacent display surface 11 is illustrated in the cross sectional view of FIG. 7 which shows the generally rectangular configuration in which the printing elements are arranged.

Figure 4:
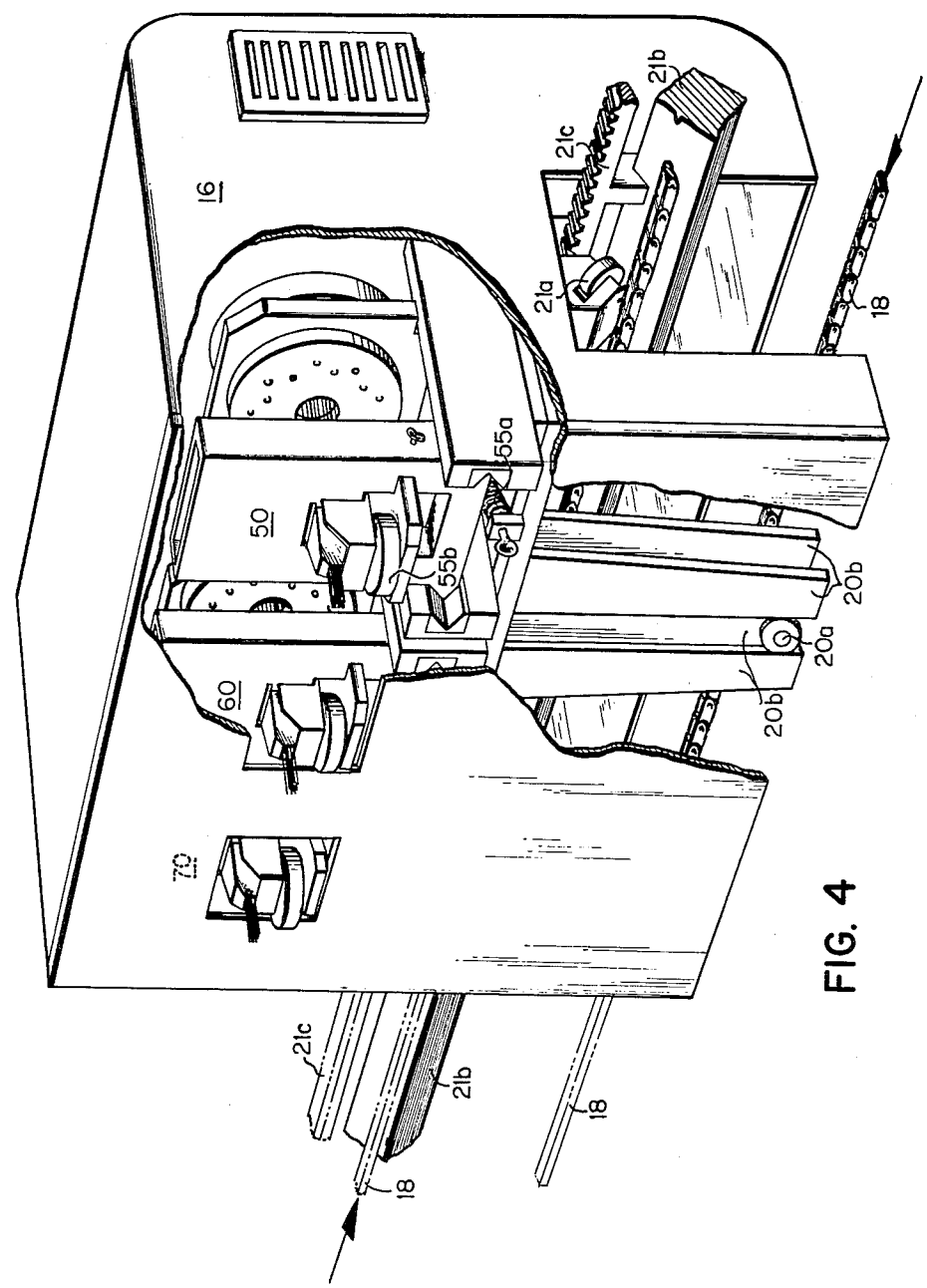
FIG. 4 is a perspective view, partly in cross section, showing the relationship of the printing heads within the carriage to the display surface.

Each of the color printing heads is preferably movable a limited distance perpendicular to the plane of display surface 11 to permit the printing elements to be properly positioned relative to surface 11. Each of the printing heads may be slidably movable in ways and is urged against surface 11 by a spring such as spring 55a for printing head 50 (FIG. 4). Each color head may be provided with a roller similar to roller 55b (FIGS. 4 and 6) which engages surface 11 to maintain the printing ends of the printing elements at the proper distance from surface 11 against the action of spring 55a. It will be understood that the foregoing description of the cyan printing head 50 will also apply to the magenta and yellow printing heads 60, 70.

The operation of the device is as follows: Assume that carriage 16 is positioned at the upper left hand corner of display surface 11 in position to start a printing operation. Slide 32 will be disposed on frame 31, and since the movement of frame 31 is synchronized with the movement of carriage 16, frame 31 will be located so as to position the transparency with the beam of light from source 33 scanning the upper left hand corner of the transparency. As carriage 16 starts across display surface 11 from left to right, gears 43 and 44 drive frame 31 and transparency 32 past the beam of light from source 33 so as to scan a line of the transparency in the same time the carriage 16 completes one horizontal traverse of display surface 11.

As indicated above, the three printing heads 50, 60 and 70 are displaced from each other along a horizontal axis and are operable to simultaneously print in their respective colors on different parts of the display surface. As further indicated above, the size of the spot scanned at any instant on slide 32 bears the same relationship to the overall area of the slide as the area occupied by the three printing heads 50, 60 and 70 bears to the total area of the display surface 11.

As carriage 16 moves across the display surface, the printing heads receive digital pulses which are instantaneous measures of the color composition of the corresponding scanned area of the transparency and the printing heads print on surface 11 in accordance with the sensed color composition. It will be seen that each of the printing heads is responsive at any given instant to the color composition of a different area of the transparency and prints on the display surface in accordance with the color rejection technique discussed above. To illustrate the printing by color rejection in accordance with the present invention, assume that at one instant the area scanned on transparency 32 has only pure blue therein. Under these conditions, blue light is transmitted through aperture 38c and blue filter 39c to photomultiplier 40c. Photomultiplier 40c produces a maximum output in response to the substantially pure blue light received and this output causes digitizing amplifier 41c to supply a signal to all of the "hold" magnets of the yellow printing head 70 so that none of the printing elements of this head are actuated to print at this instant. Simultaneously with the above described action of the yellow printer, the blue light transmitted through aperture 38b does not pass through green filter 39b to photomultiplier 40b, so that photomultiplier 40b does not receive any substantial light input. Thus, photomultiplier 40b supplies a signal to digitizing amplifier 41b which energizes all nine of the "print" coils of the magenta printing head 60. Energization of these nine coils causes the corresponding armatures to be attracted thereto and to drive the nine printing elements into contact with display surface 11 to deposit nine separate drops of magenta ink thereon in the rectangular configuration illustrated in FIG. 7.

Simultaneously with the above described action for the yellow and magenta printers, the blue light also passes through aperture 38a but is blocked by red filter 39a. Thus photomultipler 40a receives a minimum light input so that digitizing amplifier 41a energizes all of the "print" coils in the cyan printing head 50. All nine of the printing elements of the cyan printing head are thus actuated to strike display surface 11 and deposit thereon nine spots of cyan ink in a configuration similar to that shown in FIG. 7.

At the completion of this instant of scanning and printing then, the yellow printer has produced no printing in its assigned area on surface 11, while the magenta and cyan printing heads have each printed the maximum of nine spots of ink of their associated colors on adjacent areas of surface 11.

Assume that the next instant of printing occurs when the magenta printing head has moved to the spot occupied at the preceding instant by the yellow printing head, the cyan printing head has moved to the spot formerly occupied by the magenta printing head while the yellow printing head has moved to a new position to the right of its former position. Blue light is still transmitted to both the red and the green filters and these filters continue to block this blue light so that the cyan and magenta printers again print a maximum of nine spots of ink of their associated colors. The magenta spots will be printed on the portion of the display surface occupied by the yellow printing head during the preceding printing cycle. It will be remembered that the yellow printer did not print on the preceding printing cycle so that the magenta ink is deposited on the clear printing surface. The cyan printer will overprint the nine cyan spots over the nine magenta spots printed on that area during the preceding printing cycle. This mixture of cyan and magenta inks, when lighted from behind, produces blue in accordance with the laws of subtractive color. It is not essential that the overprinted dots of ink be exactly in registry with the previously printed magenta dots on the same area, since the display will be viewed from a distance and the eye of the viewer will tend to blend the adjacent or superposed spots of different colors into the proper color combinations.

During the next printing cycle, the cyan printing head will occupy the area which has occupied on the last printing cycle by the magenta head, and will overprint nine cyan dots over the previously deposited nine magenta dots to again produce an area which appears blue when lighted from behind. The above described action continues as the printer traverses the display surface line by line to accurately reproduce the colors of the original input transparency.

It will be understood that in practice the movement of the printing carriage is continuous across the display surface, but the above discussion was based on separate increments of time to clearly indicate the technique of color reproduction by color rejection. It will also be appreciated that, in the above example, the presence of pure colors only was assumed, thus resulting in actuation of the maximum or minimum number of printing elements on each printing cycle. It will be apparent, however, that a varying number of such printing elements will be actuated on each print cycle depending on the saturation levels of the individual color components. Thus, the saturation of a given color component is controlled by controlling the number of printing elements of a given subtractive color which are actuated on a given printing cycle, while the color hue is controlled by controlling the amount of over-printing of the different subtractive colors to produce the desired resultant hue.

It will be apparent to those skilled in the art, that various modifications of the invention may be employed without departing from the spirit of the invention. For example, in connection with the display surface 11, it will be apparent that a surface may be provided which can be changed periodically to present a new surface for printing a new picture. Such periodic change may be accomplished, for example, by utilizing a translucent flexible paper or plastic mounted on rolls so that the portion of the material forming the display surface may be changed by winding the material up on a take-up roll to present a new portion of the material for printing. Also, by suitable control of the printing carriage, such as by a servo network, the carriage may be made addressable to any area on the display surface so that selected areas of the display may be printed.

It will also be appreciated that where non-drying inks are utilized, as is preferable for maximum transmission of light, it is possible to mechanically erase a given printed picture by wiping or scrubbing the display surface to prepare it for the printing of a new picture. It will also be understood that where a number of displays are to be presented from a given input transparency or where a display is to be located at a point remote from the scanning location, the scanning of the input transparency may be performed at a central location and the scanning signals transmitted to the display location or locations by suitable means such as telephone wires. In connection with the latter operation, the output of the scanning device of the present invention is particularly well matched to the information handling capabilities of the average telephone line. For example, a system printing 100 dots per minute in each of three colors, with 9 printing elements per color, produces 2700 bits per minute, which bit rate is well within the information handling capability of the average telephone line.

While the invention has been particularly shown and described with reference to a preferred embodiment thereof, it will be understood by those skilled in the art that the foregoing and other changes in form and detail form and detail may be made therein without departing from the spirit and scope of the invention.

What is claimed is:

1. Apparatus for producing colored enlargements on a translucent display surface of a transparent colored input object comprising means for successively scanning incremental areas of said object to produce a beam of light having a color composition corresponding to the color composition of the scanned area of said object, a plurality of light filters corresponding to the primary additive colors, means for projecting different portions of said beam of light representing adjacent portions of said incremental area through said light filters, a plurality of light sensitive elements associated with said filters for converting the amounts of light passed by said different filters into corresponding control signals which are instantaneous measures of the color composition of the scanned area of said object, a plurality of adjacent printing heads for simultaneously printing on adjacent portions of said display surface in the three primary subtractive colors, each of said printing heads comprising a plurality of printing elements which are selectively movable into contact with said display surface to deposit thereon a spot of ink of the associated primary subtractive color, and means for controlling the number of said printing elements actuated on a given printing stroke as a function of said control signals, each of said printing heads being controlled by the control signal from the primary additive color apparatus whose color is opposite to the primary subtractive color associated with that printing head.

2. Apparatus for producing colored enlargements on a translucent display surface of a transparent colored input object comprising means for successively scanning incremental areas of said object to produce a beam of light having a color composition corresponding to the color composition of the scanned area of said object, a plurality of light filters corresponding to the primary additive colors, means for projecting different portions of said beam of light through said light filters, a plurality of light sensitive elements associated with said filters for converting the amounts of light passed by said different filters into corresponding control signals which are instantaneous measures of the color composition of the different scanned areas of said object within said incremental area, a plurality of printing heads displaced from each other for printing on said display surface in the three primary subtractive colors, each of said printing heads comprising a plurality of printing elements which are selectively movable into contact with said display surface to deposit thereon a spot of ink of the associated primary subtractive color, means for controlling the number of said printing elements actuated on a given printing stroke as a function of said control signals, each of said printing heads being controlled by the control signal from the primary additive color apparatus whose color is opposite to the primary subtractive color associated with that printing head, and means for moving said printing heads across said display surface in synchronism with the scanning of said object.

References Cited in the file of this patent

UNITED STATES PATENTS

| | | |
|---|---|---|
| 1,782,717 | Drewell | Nov. 25, 1930 |
| 1,957,646 | Hinton | May 8, 1934 |
| 2,278,940 | Murphy | Apr. 7, 1942 |
| 2,951,894 | Hirsch | Sept. 6, 1960 |

FOREIGN PATENTS

| | | |
|---|---|---|
| 457,509 | Great Britain | Nov. 30, 1936 |